UNITED STATES PATENT OFFICE.

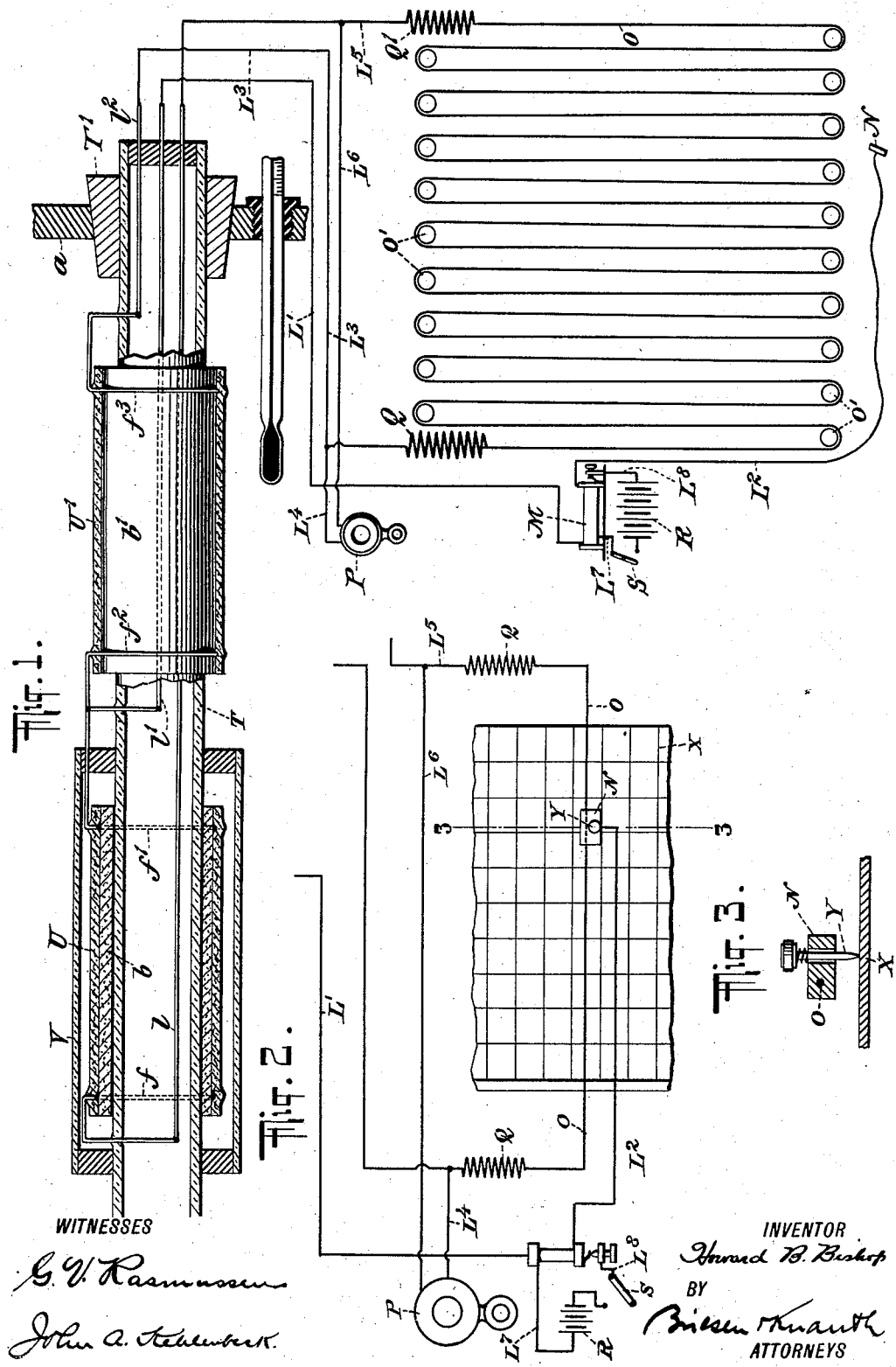

HOWARD B. BISHOP, OF NEW YORK, N. Y., ASSIGNOR TO GENERAL CHEMICAL COMPANY, OF NEW YORK, N. Y., A CORPORATION OF NEW YORK.

APPARATUS FOR TESTING FLUIDS.

940,850.  Specification of Letters Patent.  Patented Nov. 23, 1909.

Original application filed September 5, 1907, Serial No. 391,416. Divided and this application filed July 29, 1909. Serial No. 510,245.

*To all whom it may concern:*

Be it known that I, HOWARD B. BISHOP, a citizen of the United States, resident of the borough of Brooklyn, county of Kings, city and State of New York, have invented certain new and useful Improvements in Apparatus for Testing Fluids, of which the following is a specification.

My invention relates to apparatus for determining the condition of fluids, and particularly the strength or concentration of solutions, and the percentage of certain constitutents contained in gaseous mixtures.

The principle on which my invention is based is that some properties, such as the electric conductivity, are affected by changes of concentration or, broadly speaking, of composition, and any variations of such property, (e. g. conductivity) can be observed or recorded.

The object of my invention is to provide a sensitive and reliable device of the above-indicated class, in which especial provision has been made for eliminating the disturbing influence of temperature variations. My apparatus is preferably so constructed as to enable the condition of the fluid under examination, to be observed or recorded continuously, thereby affording valuable assistance in many industrial processes where it is desired to preserve a constant strength or composition, either of a final or intermediate product, or of one of the ingredients or media employed.

The present application is a division of another application filed by me in the United States Patent Office on September 5, 1907, Serial No. 391,416.

In the accompanying drawings, Figure 1 represents an apparatus for determining the condition of gases, and particularly the amount of moisture they carry; Fig. 2 is a plan view of a recording apparatus embodying my invention; and Fig. 3 is a partial vertical section on line 3—3 of Fig. 2.

In Fig. 1 I have shown a form of my apparatus particularly adapted for testing gases, and especially with reference to their degree of moisture.

$a$ indicates the container, in this case a pipe or flue, through which the gas (such as sulfurous acid) to be tested, is passed. Into this container projects a (glass) tube T held by means of a stopper or plug T' and serving as a carrier for the standard section and the test section of the apparatus. The standard section as shown comprises an unglazed porcelain tube $b$ near the ends of which are platinum electrodes $f$ $f'$ in the nature of fine surrounding wires. These wires are in contact with a wrapper U of asbestos or other suitable retaining material. The electrode wire $f$ is soldered to the insulated copper wire $l$, and fused into the tube T. The tube $b$ with the asbestos wrapper U is moistened with commercially pure sulfuric acid, say of 93% preferably by allowing the acid to flow over the tube, and to drain while the latter is in a horizontal position in a closed tube. Then the tube $b$ is inclosed in the glass tube V, stoppered at each end, and sealed with sulfur or otherwise. The gas under examination cannot therefore come in contact with the acid in the standard section, although such acid is exposed to the thermic influence of the said gas.

The gas has direct access to the test section, which comprises a tube $b'$ (say of unglazed porcelain) with platinum wire electrodes $f^2$ $f^3$ and an asbestos wrapper U' of the same character as above referred to, and moistened with concentrated sulfuric acid. The electrodes $f'$ $f^2$ are welded together, fused into the tube T and soldered to the insulated copper wire $l'$. The electrode wire $f^3$ is likewise fused into the tube T, and soldered to the insulated copper wire $l^2$. As the right hand end of the tube T is closed, the wires $l$, $l'$, $l^2$ are protected against attack by the gas under examination.

It will be understood that both in the standard section and in the test section a thin film of acid remains on the tube between the electrodes. The conductivity of the film in the standard section is not affected by changes in the composition or specifically the degree of moisture, of the gas under examination. The thermic influence of such gas is exerted alike on the two sections of the apparatus.

The two sections having been moistened and prepared for use as described, the tube or carrier T is secured within the pipe or container $a$, and the wires $l$ $l'$, $l^2$ connected with the electric determining apparatus.

The adjustable electrical part of the apparatus is practically a Wheatstone bridge. The electrodes $f'$, $f^2$ are both connected, as by a wire, $l'$, with the same pole of a source of electricity, in the present case the secondary winding of an induction coil M. The other terminal of the secondary is connected by a wire $L^2$ with a slide or movable connection N, which may be brought to different points of the bridge wire O. This wire, consisting of German silver or other suitable material, may be coated with vaseline to prevent corrosion, and strung tightly back and forth on porcelain insulators $O'$ as shown. I desire it to be understood, however, that the bridge may be constructed differently. One end of the bridge wire is connected by a wire $L^3$ with the electrode $f^3$ and by a wire $L^4$ with one terminal of an indicator or recorder, such as a telephone P; the other end of the bridge wire is connected by a wire $L^5$ with the electrode $f'$ and by a wire $L^6$ with the other terminal of the indicator P. Resistance spools Q, $Q'$ are preferably located at the ends of the bridge wire. R is a battery having its poles connected by wires $L^7$, $L^8$ with the primary of the induction coil M, the switch S serving to throw the electrical apparatus into or out of action.

The apparatus is first calibrated or standardized by passing gas through the pipe $a$, shifting the movable connection N on the wire O until no sound is heard in the telephone P and marking on the scale at that point, the corresponding degree of moisture determined by an approved method. By marking a series of points in this manner, and suitable interpolating, the apparatus is standardized. The temperature should however be noted by means of a thermometer placed in the pipe $a$. This determination is based on the fact that for every percentage of moisture in a gas at a given temperature there is a corresponding percentage of sulfuric acid that will be in equilibrium with that gas, that is, the acid will neither be concentrated nor weakened by passing the gas over it. But with an increase or decrease in temperature there will be a corresponding concentrating or weakening of the acid, so that it is necessary to refer to a table of vapor tensions of sulfuric acid at varying temperatures and concentrations.

The apparatus having been standardized the degree of moisture of the gas can be determined instantly at any time by closing the switch S and shifting the connection N until no noise is heard in the telephone. The operator will then read off the temperature on the thermometer and the indication on the scale adjacent to the wire O, and by referring to a table will determine the degree of moisture of the gases, expressed in any desired unit, as milligrams of moisture per cubic foot of gas.

Whenever it is desired to test a fluid (liquid or gaseous) as to properties which affect its electrical conductivity, or the electrical conductivity of a testing fluid, the particular apparatus described above may be used. It may be that in some cases the connection N may be moved over a long stretch of wire O without causing an audible sound in the telephone P; in such cases the corresponding graduation mark would be applied at the center of such wire portion. I desire it to be clearly understood, however, that the electric determination of varying conditions of fluids is but one way of availing oneself of the advantages of my invention.

The apparatus hereinbefore described is operated on the principle of acoustic observation, but no record is made of such observations. Various ways might be adopted for obtaining a record, either intermittent or continuous. An intermittent record might be secured by the simple addition of a record sheet X (Figs. 2 and 3) of the usual character moved by a clockwork (not shown), adjacent to the wire O (suitably arranged with reference to the direction in which the sheet moves, that is, preferably straight and at a right angle to the sheet's movement). Every time the operator makes a determination, he might put a mark on the record sheet, as by pressing a point or stylus Y connected with the slide or movable member N.

I desire it to be clearly understood that while at present I prefer to determine the conductivity of the fluid under examination, other expedients may be adopted for this purpose. An important feature of my invention is that the fluid under examination does itself equalize the temperature of the standard and test actions of the apparatus, by exerting a thermic influence on both, but has no access to the fluid in the standard section.

A very important feature of my invention is that the fluid under examination exerts a thermic influence on both the standard section and on the test section, thus equalizing variations of temperature and avoiding their disturbing influence. The test section alone is exposed to the influences of variations in the composition of the fluid under examination, while the standard section, being closed against the entrance of such fluid, (while under its thermic influence), is shut off or excluded from the influence of variations in the composition of the fluid being tested. In other words variations of that feature (such as conductivity) which is really determined in the apparatus, will affect only the test section, but not the standard section.

I claim as my invention:

1. An apparatus for testing gases, which comprises a carrier, a standard section and a test section supported on said carrier, each of the sections consisting of a tubular body with electrodes near the ends, a shell for inclosing the tubes and electrodes of the standard section, while the corresponding parts of the test section are exposed, and electrical apparatus, connected with said electrodes, for observing differences in conductivity between the standard section and the test section.

2. An apparatus for testing gases, which comprises a carrier, a standard section and a test section supported on said carrier, each of said sections being provided with electrodes, a shell for inclosing the standard section and its electrodes, while the test section and its electrodes are exposed and electrical apparatus connected with said electrodes for observing differences in conductivity between the standard section and the test section.

In testimony whereof I have hereunto set my hand in the presence of two subscribing witnesses.

HOWARD B. BISHOP.

Witnesses:
   JOHN A. KEHLENBECK,
   G. V. RASMUSSEN.